US008233449B2

(12) United States Patent
Agulnik et al.

(10) Patent No.: US 8,233,449 B2
(45) Date of Patent: Jul. 31, 2012

(54) METHOD AND APPARATUS FOR RESOURCE ALLOCATION IN A SHARED WIRELESS NETWORK

(75) Inventors: Anatoly Agulnik, Deerfield, IL (US); Rod N. Averbuch, Chicago, IL (US); Matthew C. Keller, Algonquin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 303 days.

(21) Appl. No.: 12/648,476

(22) Filed: Dec. 29, 2009

(65) Prior Publication Data

US 2011/0158184 A1    Jun. 30, 2011

(51) Int. Cl.
*H04W 4/00* (2009.01)

(52) U.S. Cl. .................... 370/330; 370/432; 370/468

(58) Field of Classification Search .................. None
See application file for complete search history.

(56) References Cited

U.S. PATENT DOCUMENTS

| | | |
|---|---|---|
| 5,778,320 A | 7/1998 | Drozt |
| 7,068,607 B2 | 6/2006 | Partain |
| 7,092,356 B2 | 8/2006 | Rabie |
| 2003/0043741 A1 | 3/2003 | Mukai et al. |
| 2005/0243759 A1 | 11/2005 | Torarp et al. |
| 2006/0072453 A1 | 4/2006 | Olariu et al. |
| 2008/0221951 A1 | 9/2008 | Stanforth |
| 2008/0222019 A1 | 9/2008 | Stanforth |
| 2008/0222020 A1 | 9/2008 | Stanforth |
| 2008/0222021 A1 | 9/2008 | Stanforth |
| 2008/0240034 A1 | 10/2008 | Gollamudi |
| 2009/0154351 A1 | 6/2009 | Kim |
| 2009/0154413 A1 | 6/2009 | Kim et al. |
| 2009/0157880 A1* | 6/2009 | Lee et al. ................. 709/226 |
| 2009/0161540 A1* | 6/2009 | Zaki et al. ................. 370/230 |
| 2009/0325585 A1 | 12/2009 | Farajidana et al. |
| 2010/0195583 A1 | 8/2010 | Nory et al. |
| 2010/0240384 A1* | 9/2010 | Nobukiyo et al. ......... 455/452.1 |

FOREIGN PATENT DOCUMENTS

| | | |
|---|---|---|
| EP | 1443790 A1 | 8/2004 |
| EP | 1729532 A1 | 12/2006 |
| EP | 2026514 A1 | 2/2009 |
| WO | 01027644 A1 | 4/2001 |
| WO | 2004030393 A1 | 4/2004 |

(Continued)

OTHER PUBLICATIONS

PCT International Search Report Dated Mar. 4, 2011.

(Continued)

*Primary Examiner* — Bob Phunkulh
(74) *Attorney, Agent, or Firm* — Valerie Davis

(57) ABSTRACT

Resource allocation is performed in a shared wireless network that includes multiple cells, a shared wireless network QoS manager, and multiple local QoS managers. The shared wireless QoS manager receives from multiple ones of the local QoS managers on a per cell and per QoS service class basis (for a plurality of QoS service classes): an aggregation of current cell usage estimations; an aggregation of cell load level indicators, and an aggregation of additional resources needed. Using this received information, the shared wireless network QoS manager: determines a total capacity of each cell that is needed to satisfy a total resource need on a cell by cell basis for the local QoS managers; and based on a maximum capacity for each cell, allocates to each local QoS manager a percentage of their total resource need.

13 Claims, 5 Drawing Sheets

FOREIGN PATENT DOCUMENTS

WO        2009141016 A1    11/2009

OTHER PUBLICATIONS

"ARP Value Range", Motorola, 3GPP Draft; S2-085782 ARP Value Range in EPS—Discussion, 3rd Generation Partnership Project (3GPP), Mobile Competence Centre; 650, Route Des Lucioles; F-06921, Sophia-Antipolis Cedex; France; vol. SA WG2, No. Sophia; 20080819, Aug. 19, 2008; XP050267794.

RFC 4495, Polk, et al. "A Resource Reservation Protocol (RSVP) Extension for the Reduction of Bandwidth of a Reservation Flow", May 2006.

RFC 2638, Nichols, et al. "A Two-Bit Differentiated Services Architecture for the Internet", Jul. 1999.

Salami, G. et al., "Non pool based spectrum sharing for two UMTS operators in the UMTS Extension band," PIMRC 2008, Sep. 15, 2008.

Garcia, L et al., "Comparison of Spectrum Sharing Techniques for IMT-A Systems in Local Area Networks," IEEE, 2009.

Non Final Office Action mailed Jan. 24, 2012, in U.S. Appl. No. 12/643,085, Ramandeep Ahuja, filed Dec. 21, 2009.

International Search Report and Written Opinion for International Application No. PCT/US2010/058627 mailed on Feb. 18, 2011.

Lao, L. et al., "Reducing Multicast Traffic Load for Cellular Networks using Ad Hoc Networks," Proceedings of the 2nd International Conference on Quality of Service in Heterogeneous Wired/Wireless Networks (Qshine' 05), IEEE, Aug. 22, 2005, pp. 10.

* cited by examiner

METHOD AND APPARATUS FOR RESOURCE ALLOCATION IN A SHARED WIRELESS NETWORK

TECHNICAL FIELD

The technical field relates generally to communication systems and more particularly to a method and apparatus for resource allocation in a shared wireless network.

BACKGROUND

With the expected advantages of Long Term Evolution (LTE), which is being developed by $3^{rd}$ Generation Partnership Project (3GPP) as the last step toward the $4^{th}$ generation (4G) of radio technologies and is being designed to increase the capacity and speed of wireless networks, such as a mobile telephone radio access networks (RANs), to provide for an end-to-end Internet Protocol (IP) service delivery of media, most major carriers in the United States (US) and several worldwide carriers have announced plans to convert their wireless networks to LTE beginning in 2009. In addition, public safety agencies (and US Intelligence Services) in the US have endorsed LTE as the preferred technology for 700 MHz broadband solutions for public safety. However, due to the system cost, sharing of broadband LTE wireless networks is anticipated; even sharing of these wireless networks by public safety agencies.

With each agency independently providing services for its users, it becomes necessary to prevent any agency from disproportionately consuming communication resources within any particular cell in the shared wireless network. However, an equitable distribution of wireless network resources is not possible using the current resource allocation mechanisms, wherein each agency independently interacts directly with the wireless network to reserve bandwidth and to specify Quality of Service related parameters for reserved resources.

Thus, there exists a need for a method for resource allocation in a shared wireless network.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
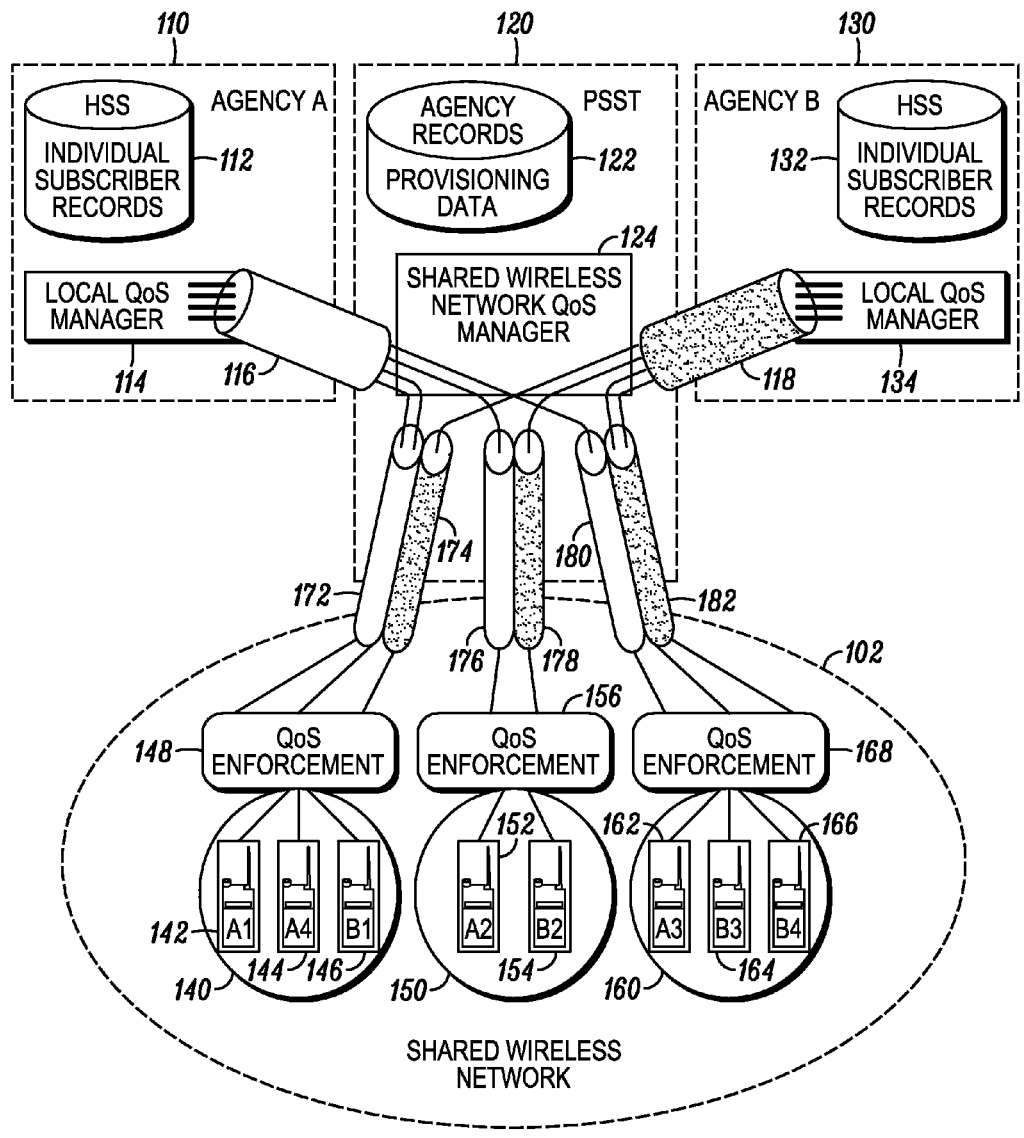
FIG. 1 is a diagram of a communication system that implements resource allocation in a shared wireless network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, resource allocation is performed in a shared wireless network that includes multiple cells, a shared wireless network QoS manager, and multiple local QoS managers. The shared wireless QoS manager receives from each of at least a subset of the local QoS managers on a per cell and per QoS service class basis (for a plurality of QoS service classes): an aggregation of current cell usage estimations; and an aggregation of additional resources needed. The shared wireless QoS manager further receives from the cells and/or the local QoS managers an aggregation of cell load level indicators. Using this received information, the shared wireless network QoS manager: determines a total capacity of each cell that is needed to satisfy a total resource need for all the local QoS managers on a cell by cell basis; and based on a maximum capacity for each cell and a resource agreement with each local QoS manager, replies to each local QoS manager with a percentage of their total resource need.

Embodiments of the disclosed teachings enable a more effective arbitration between agencies' requests for shared resources, which takes into consideration agency priority specific information such as pre-defined incident types and incident levels and their relative priorities, user role, etc. Moreover, the shared wireless QoS manager keeps track of aggregated usage of the shared wireless network resources per cell and per service class, and closes the resource management loop by collecting current usage estimations and current load level indicator information on a cell by cell basis and a per QoS service class basis, which allows for admission decisions that better address the resource allocation needs of all agencies in each cell of the shared wireless networks. Those skilled in the art will realize that the above recognized advantages and other advantages described herein are merely illustrative and are not meant to be a complete rendering of all of the advantages of the various embodiments.

Referring now to the drawings, and in particular FIG. 1, a communication system that implements resource allocation in a shared wireless network in accordance with some embodiments, is shown and indicated generally at 100. System 100 comprises an Agency A infrastructure 110 (having a database 112 and a local Quality of Service (QoS) manager 114) and an Agency B infrastructure 130 (having a database 132 and a local QoS manager 134) that each support and provide application services to multiple subscribers (e.g., subscribers 142 (A1), 152 (A2), 162 (A3), and 144 (A4) of Agency A and subscribers 146 (B1), 154 (B2), 164 (B3), and 166 (B4) of Agency B) that share a common radio access network (RAN) 102. System 100 further includes a shared network resource management infrastructure 120 (having a database 122 and a shared wireless network QoS manager 124) that manages resource allocation in the shared wireless network 102 between all of the agencies having subscribers connected to the wireless network 102. Other elements may be included in the system 100 such as one or more Computer Aided Dispatch (CAD) servers, application servers, a 911 public safety answering point (PSAP) (e.g., where both commercial and public safety users share a wireless network), etc.

In this illustrative embodiment, at least the subscribers and the wireless network 102 infrastructure elements (not shown) implement protocols and signaling that are compliant with 3GPP Technical Specifications (TS) for LTE, such as the most recent version that was published in September 2009 as "Release 9" or any other prior or future release such as Release 10, which is currently being developed. Those skilled in the art, however, will recognize and appreciate that the specifics of this example are merely illustrative of some embodiments and that the teachings set forth herein are applicable in a variety of alternative settings. For example, additional agencies can share the wireless network 102, thereby, supporting additional subscribers than what is shown; and other types of wireless networks, wherein other standard or proprietary signaling techniques such as cdmaone, W-CDMA (UMTS), CDMA200, etc., are implemented, can be used to facilitate the teachings herein. As such, other alternative implementations of using different types of communication systems are contemplated and are within the scope of the various teachings described.

In general, the QoS managers 114, 124, and 134, some wireless network infrastructure elements (not shown), and the subscribers of system 100 are each implemented using a memory, one or more network interfaces, and a processing device that are operatively coupled, and which when programmed form the means for these systems elements to implement their desired functionality, for example as illustrated by reference to FIGS. 2 to 6. The network interfaces are used for passing signaling (e.g., messages, packets, datagrams, frames, superframes, and the like) between the elements of the system 100. The implementation of the network interface in any particular element depends on the particular type of network, i.e., wired and/or wireless, to which the element is connected. For example, where the network supports wired communications, the interfaces may comprise a serial port interface (e.g., compliant to the RS-232 standard), a parallel port interface, an Ethernet interface, a USB interface, and/or a FireWire interface, and the like. Where the network supports wireless communications, the interfaces comprise elements including processing, modulating, and transceiver elements that are operable in accordance with any one or more standard or proprietary wireless interfaces, wherein some of the functionality of the processing, modulating, and transceiver elements may be performed by means of the processing device through programmed logic such as software applications or firmware stored on the memory device of the system element or through hardware.

The processing device utilized by the QoS managers 114, 124, and 134, wireless network infrastructure elements, and subscribers may be programmed with software or firmware logic or code for performing signaling and other functionality such as that needed to implement embodiments of the disclosure described by reference to FIGS. 2 to 6; and/or the processing device may be implemented in hardware, for example, as a state machine or ASIC (application specific integrated circuit). The memory implemented by these system elements can include short-term and/or long-term storage of various information needed for the functioning of the respective elements, such as, for instance, various databases described below with reference to embodiments shown in FIG. 1. The memory may further store software or firmware for programming the processing device with the logic or code needed to perform its functionality.

We now turn to a brief description of the functionality of the system elements shown in FIG. 1, which will aid in understanding the later description of methods of the present disclosure, by reference to FIGS. 2 to 6. The subscribers (also referred to herein as "users") 142, 144, 146, 152, 154, 162, 164, 166 which are also referred to in the art as communication devices, access devices, user equipment, access terminals, mobile stations, mobile subscriber units, mobile devices, user devices, and the like, can be any standard communication device such as radios, mobile phones, mobile data terminals, Personal Digital Assistants (PDAs), Smartphones, laptops, two-way radios, cell phones, and any other device capable of operating in a wired or wireless environment and that can be used, for example, by responders dispatched as a result of an emergency call.

The wireless network 102 in this embodiment is a E-UTRAN (Evolved UMTS Terrestrial Radio Access Network) comprising a plurality of cells, e.g., 140, 150, 160, each having an ENodeB (not shown); and, thus, the terms wireless network and RAN are used herein interchangeably, although network 102 can be any type of wireless network. Each cell represents a geographic coverage area that provides the wireless resources termed herein as "bearers" for carrying subscriber data (also termed service data flows or SDFs) for subscribers connected to the RAN. The ENodeB devices serve as a point of access to allocated bearers for the subscribers and further serve as the intermediate infrastructure devices between the subscribers and QoS enforcement elements 148, 156, 168, which in some embodiments are implemented in one or more logical elements in an LTE evolved packet core (EPC) (such as a Policy and Charging Enforcement Function in a Packet Data Gateway) and/or in a logical element of the ENodeBs. Depending on the particular RAN implementation, the RAN can include other infrastructure devices such as, but not limited to, bridges, switches, zone controllers, base station controllers, repeaters, base radios, base stations, base transceiver stations, access points, routers or any other type of infrastructure equipment interfacing any entity in a wireless or wired environment.

As mentioned above, the wireless resources used for carrying subscriber data traffic (or SDFs) are termed herein as "bearers", and in general are the logical over-the-air, wireless transmission paths in a wireless network (such as a RAN) that are used to carry the SDFs), and are characterized for example by certain carrier frequencies, etc. A bearer can be a dedicated bearer or a default bearer. A default bearer is a non-GBR (guaranteed bit rate) bearer that provides for best effort SDF transmission and is granted to a subscriber upon connecting to the RAN and for the duration of its connection to the RAN and need not be explicitly requested. Some networks are solely best efforts networks and, therefore, do not support any type of Quality of Service.

However, communication system 100 supports Quality of Service in that it contains resource reservation mechanisms, in accordance with the teachings herein, that provides for different priority to different applications, users, or SDFs and/or guarantees a certain level of performance to a SDF such as, for instance, by guaranteeing one or more QoS parameters such as a minimum bit rate, delay, jitter, packet dropping probability, bit error rate, and the like. A subscriber is provided QoS through the request and granting of a dedicated bearer for the subscriber. To facilitate the QoS mechanism, QoS is quantized based on a plurality of QoS service classes, wherein each QoS service class is characterized by certain QoS guarantees. For example, the 3GPP TS for LTE specify a number of Quality of Service class identifiers, each associated with a minimum guaranteed bit rate. Thus, resources (e.g., one or more dedicated bearers) can be requested in particular QoS service classes to meet performance requirements for certain applications (e.g., real-time multimedia applications) running on the subscribers. Such requests are termed herein "bearer requests" or "QoS requests" or "resource requests".

Agencies A and B are generally any "local" entity (i.e., constrained to a particular geographic and/or group of users) that provides application services to the subscribers within the agency. In one illustrative example, the Agencies A and B are public safety or government agencies that operate within a given jurisdiction. However, a commercial agency or other private agency or public users could share resources of the same RAN and could use the RAN for 911 emergency services. Agency A infrastructure 110 at least includes, but is not limited to, the database 112 and the local QoS manager 114. The database 112 is a logical construct that maintains records on the subscribers in the agency and can physically reside in the agency or in the shared wireless network or a combination of both. Such subscriber records stored in database 112 include data like device capabilities, dynamic priority of users based on an on-going incident, applications running on the subscriber, user role, etc.

The local QoS manager 114 provides resource management information 116 to the shared wireless network QoS manager 124. This resource management information 116 can include, in accordance with the teachings herein and where available to the local QoS manager 114: cell usage estimations for each cell and each QoS service class in which the agency has subscribers currently connected to the RAN and using bearer resources for their communications; cell load level indicators for each cell in which the agency has subscribers currently connected to the RAN; and QoS requests for additional resources per cell and per QoS service class. Similarly, the Agency B infrastructure 130 includes the database 132 and the local QoS manager 134 having similar functionality as the corresponding elements in Agency A, with the local QoS manager 134 providing resource management information 118 to the shared wireless network QoS manager 124. It should be noted that there is a one-to-one relationship shown in FIG. 1 between an agency and a local QoS manager. However, a single local QoS manager could service multiple agencies in accordance with an alternative embodiment of the teachings herein.

Moreover, in another embodiment, the agency database and accompanying local QoS manager is implemented in or otherwise interfaces to a Computer Aided Dispatch (CAD) server of a public safety agency. One advantage of incorporating the teachings into or in conjunction with a CAD server is that the CAD server has global visibility to information about all responders and their subscribers dispatched to an incident and the subscribers of patrolling officers, including applications needed or currently running on the subscribers as well as location information of the subscribers, pre-defined incident type and incident levels and their relative priorities, which can be used for determining aggregate resource needs for its users per cell and QoS service class. Also, since the CAD server has visibility of an incident from start to finish, the CAD server has an advantageous vantage point for providing information used to determine aggregate resource requests and for maintaining information regarding current resource usage of its subscribers. However, the embodiments of the current teachings can be implemented on any suitable hardware and software and/or firmware platform that comprises an existing device or a dedicated device in an agency or some combination thereof.

The shared network resource management infrastructure 120 at least includes, but is not limited to, the database 122 (memory) and the shared wireless database 122 stores provisioning data for the agencies for which it manages resource allocation for the RAN 102. The provisioning data includes the resource management information 116, 118 received from the Agencies A and B through a suitable interface. The processing device of the shared wireless network QoS manager 124 uses the information 116, 118, in accordance with the teachings herein and as described in detail below, to determine a total capacity for each cell of the RAN 102 that is needed to satisfy a total resource need for all of the local QoS managers, and compares the total capacity need to a maximum capacity for each cell. Based on this comparison and resource agreements with each local QoS manager or agency, the processing device in the shared wireless network QoS manager 124 determines a percentage of total resource need granted to each local QoS manager per cell. The percentage granted of total resource need is communicated to each local QoS manager via the interface of the shared wireless network QoS manager 124; wherein, the local QoS managers each determine the distribution (e.g., 172 to 182) of its granted resources (i.e., dedicated bearer resources) for maintaining current usage and/or for new resource requests for the one or more agencies that it serves.

The shared network resource management infrastructure 120 can be implemented anywhere in the system 100 having connectivity to all local QoS managers sharing the same RAN 102. In one illustrative embodiment, the shared network resource management infrastructure 120 is implemented in apparatus managed by the Public Safety Spectrum Trust (PSST), which is an entity that holds and manages the 700 MHz broadband public safety license.

Figure 2:
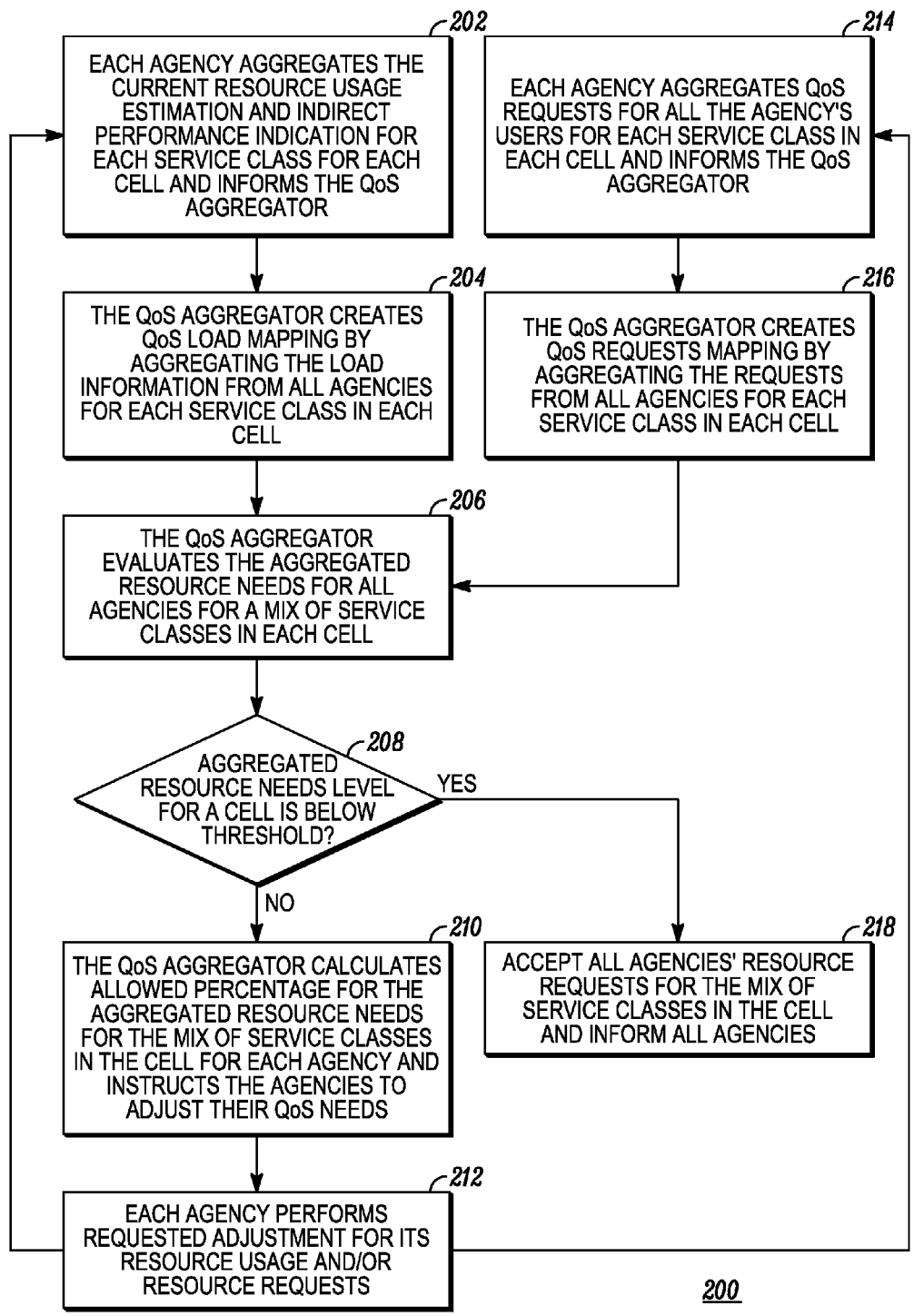
FIG. 2 is a flow diagram illustrating a method for resource allocation in a shared wireless network in accordance with some embodiments.

Turning now to FIG. 2, a flow diagram illustrating a method for resource allocation in a shared wireless network is shown and generally indicated at 200. In an embodiment, the functionality shown in FIG. 2 is implemented in a shared wireless network QoS manager in conjunction with multiple local QoS managers, such as the QoS managers 114, 124, 134. Moreover, with respect to the description herein, the functionality illustrated and described by reference to the flow diagram of FIG. 2 can be performed by means of, for example, a processing device (examples of which are given below) programmed with logic or code to perform its functions, wherein the logic is stored as software and or firmware in a suitable memory device; and/or a processing device implemented as a state machine or ASIC.

As mentioned briefly above, in order to perform its functionality, the shared wireless network QoS manager 124 needs three types of information: an aggregation of current cell usage estimations; an aggregation of cell load level indicators; and an aggregation of additional resources needed (e.g., based on QoS requests for dedicated bearers or simply QoS requests). As used herein, the term "aggregation" or "aggregate" means a collection or composite for or based on multiple subscribers. "Cell usage" means a measure of a percentage or part of bearer resources allocated to a local QoS manager that is currently being used by its subscribers or a measure of a percentage or part of the total bearer capacity of a cell being used by the subscribers of all local QoS managers; "cell load level indicators" provide a measure of congestion or traffic within a cell and may correspond to cell usage; and "additional resources" means request for additional dedicated bearers.

Accordingly, at 202, each local QoS manager (or agency via the local QoS manager when there is a one-to-one relationship as shown in FIG. 1) aggregates current cell usage estimates for its users based on current dedicated bearer resources allocated for that QoS manager. The aggregations are received, via a suitable interface, at the shared wireless network QoS manager and are generated on a cell by cell basis and on a service class by service class basis. In other words, the aggregations of current cell usage estimations are broken down by cell (at the cell level) and by QoS service class (at the service class level) and are provided by the local QoS managers for those cells and QoS service classes for which it has current resource allocations.

The local QoS managers can easily obtain the current cell usage estimation directly from the agencies that it services since many agencies (especially public safety agencies), in the normal course of business, usually maintain details of its users' locations, activities, services or applications they're utilizing and why (e.g., based on incident and functional role assignments, agency's policies and workflows), etc. Therefore, the aggregation of current cell usage estimations provided by the agencies will likely be relatively accurate as compared to such information indirectly provided outside of the agency.

In addition, the shared wireless network QoS manager 124 also receives an aggregation of current load level indicators, which is provided for each cell and each QoS service class for all users over all of the agencies. Such information regarding cell load that is currently being utilized is provided to the shared wireless network QoS manager, in one embodiment, by the cells themselves (e.g., from the eNode B) and is therefore a "direct" indication or measure of cell load for each QoS service class, for instance by measuring total packets in a queue for transmission, total packets being transmitted, etc., using any suitable means.

In another embodiment that is implemented alternatively or in addition thereto, at least some (two or more) local QoS managers provide (202) the aggregation of current load level indicators at the cell level and the QoS service class level based on one or more "indirect" QoS service class performance characteristics. For example indirect QoS service class performance characteristics that indicate or estimate cell load level include, but are not limited to packet, loss, jitter, web browsing response time, packet delay, signal-to-noise (S/N) ratio, bit rate, bit error rate (BER), etc., either individually or in combination. Such QoS performance information can be collected, for instance, from the applications, subscribers, a media controller, a mobile IP (Internet Protocol)/VPN (virtual private network)/mobile VPN middleware, etc.

It should be noted that, as compared to direct cell load level measurements, the indirect indicators may in some instances provide a less accurate measure of cell load. For example, where packet loss is the indirect cell load indicator provided, packet loss can occur not only from exceeding the capacity of the channel, but also due to transmission errors over the wireless channel caused by noise or interference. However, such issues with some of performance measurements can be mitigated by the local QoS managers combining per class/cell measurements from different sessions and also utilizing some additional information such as S/N ratios available to the subscribers.

Using the aggregations of cell usage estimations and cell load level indicators (referred to collectively as the "cell load" or simply "load"), the shared wireless network QoS manager creates (204) a QoS load mapping by aggregating the load information from all agencies for each service class in the cell. The shared wireless network QoS manager combines the cell load information received from all the agencies in the order to improve the accuracy of the "aggregated" cell load information. Moreover, the per service class and per cell QoS performance aggregation enables a more accurate cell load view by averaging load information related to service classes from a wide range of users from different agencies that share the cell resources. The per service class and per cell load aggregation also enables the cell load information to be used for an agency/local QoS manager that does not have a recent history of QoS performance characteristics related to a particular service class. In other words, the shared wireless network QoS manager does not have to have the cell load level indicators from a particular agency to make a resource availability evaluation for this agency because it can use information provided by other agencies.

In the case of the public shared wireless network, where public users may share the wireless network with public safety users, the cell load related to high priority 911 emergency services is also taken into consideration. In accordance with this embodiment, the shared wireless network QoS manager interfaces with a local QoS manager that services 911 emergency call traffic for the public users to gather an aggregation of current cell usage, an aggregation of cell load level indicators, and also an aggregation of additional resources needed (discussed in detail below) as corresponds to the 911 emergency call traffic.

Turning back to FIG. 2, at 214, each agency/local QoS manager combines the resource requests from all the agency's users per service class and per cell and provides this aggregation of additional dedicated bearer resources needed to the shared wireless network QoS manager, which may include predicted resource needs for new sessions (e.g. additional talk group calls at an incident scene). The shared wireless network QoS manager combines (216) all the resource requests from all the agencies per service class for each cell. The aggregation of the resource requests for multiple classes enables advantages of the present disclosure, as seen, for instance by reference to FIGS. 3 and 4 and the accompanying description.

In a first case scenario, the shared wireless network QoS manager receives only a general resource request from each agency. Thus, all that the shared wireless network QoS manager can consider in this case with regards to resource allocation is based on the sum of all requests. The shared wireless network QoS manager cannot assume any application behavior characteristics such as jitter, acceptable BER, delay, and so on. By contrast, in accordance with the teachings herein, the shared wireless network QoS manager can take advantage of the classes' characteristics to evaluate the load impact of every class's resource request. More particularly, the shared wireless network QoS manager weighs each class from every agency/local QoS manager differently in order to evaluate the impact on a cell's total load. For instance, different jitter requirements between QoS service different classes allow an efficient mix and lower combined resource needs.

Figure 3:
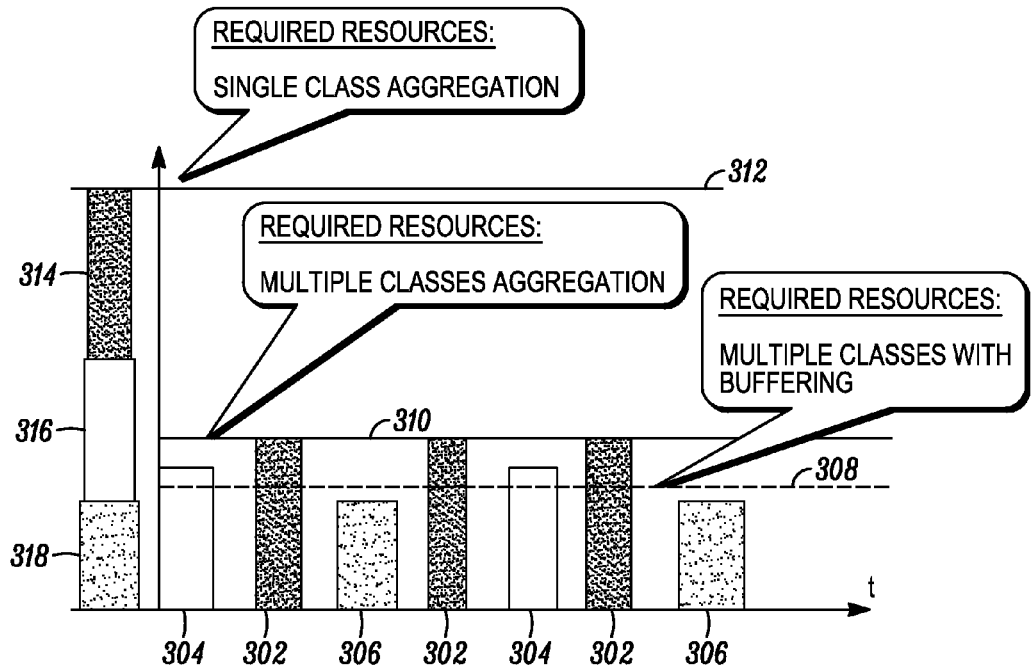
FIG. 3 is a chart diagram illustrating resource allocation using Quality of Service (QoS) aggregation over multiple QoS service classes in accordance with some embodiments.

For example, as illustrated in FIG. 3, the mix of the resource requests for different QoS service classes (e.g., for a class 1 for an agency 1 (304), for a class 2 for and agency 2

Figure 4:
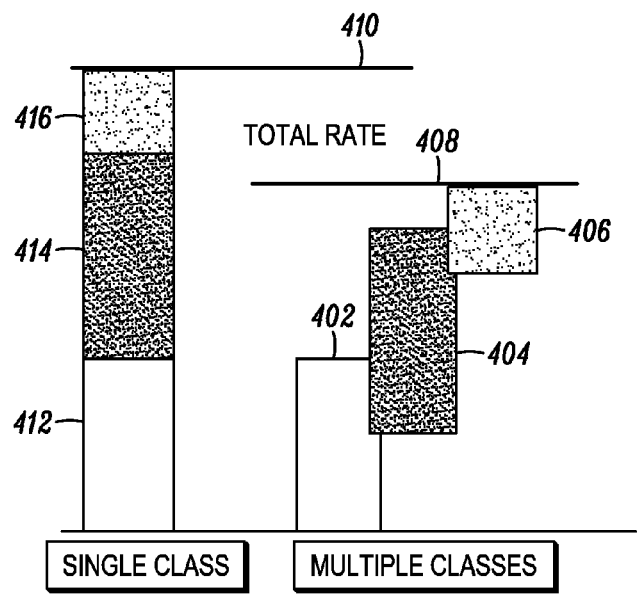
FIG. 4 is another chart diagram illustrating resource allocation using QoS aggregation over multiple QoS service classes in accordance with some embodiments.

(302), and for a class 3 for an agency 3 (306)) requires in many instances less total resources (e.g., 310 or 308 with jitter buffering) than a sum (312) of the requests if only a single class is considered for agencies 1 (316), 2 (314) and 3 (318). The jitter variation between QoS service classes in this example allows efficient mixing. Basically the same resource can be utilized to transmit a burst of one session at a time between bursts of the other sessions. Similarly, FIG. 4 shows that considering an aggregation (408) of different QoS service classes needs from different agencies (e.g., for a class 1 for an agency 1 (402), for a class 2 for and agency 2 (404), and for a class 3 for an agency 3 (406)) in many instances provide a more accurate resource allocation result than considering a sum (410) for single service class only for the three agencies (412 for agency 1, 414 for agency 2, and 416 for agency 3).

Turning again to FIG. 2, upon receiving the information as a result of functions 202, 204, 214, and 216, the shared wireless network QoS manager evaluates (206) a capacity of each cell that is needed to satisfy an aggregate (total) dedicated bearer resource need for all agencies for a mix of service classes in each cell and compares (208) this aggregate resource need for each cell to a maximum bearer resource capacity of the cell. In an illustrative implementation, the shared wireless network QoS manager creates an aggregate current load and aggregate new requests mapping for every class and for every cell of the shared wireless network; and the shared wireless network QoS manager makes QoS decisions for each specific agency's/local QoS manager's service class QoS resource needs based on the aggregated current load and new requests in each cell. The shared wireless network QoS manager is enabled for this functionality because it has a gross view of each cell's current load level based on the current cell usage estimations and indirect (or direct) cell load level indicators received from the agencies. The shared wireless network QoS manager also has the agencies' predictions for the new/additional resource requests.

The shared wireless network QoS manager evaluates the aggregated impact of the resource requests of multiple service classes of the same priority level from all the agencies on the cell's total load. Then the shared wireless network QoS manager makes a single decision (208) for all the classes of the same priority level based on the total resource needs level for this service classes mix: if the total resource needs level is below a predefined threshold (e.g., the total capacity/bandwidth of the cell), then resource requests for all the service classes in the mix are accepted (218); if the total resource needs level is above a predefined threshold, then only some percentage of the resource needs for all the service classes in the mix will be allowed (210) (e.g., the same percent for all classes). The allowed percentage can be calculated for example as the ratio between the total resource needs and the predefined threshold. Notice, that the allowed percentage is for the aggregated resource needs (that includes both the current cell usage and resource requests), not just for the requests, which is different from other admission control methods. The shared wireless network QoS manager responds to each local QoS manager with the allowed percentage of the resource needs for its agencies for the service classes mix considering the agencies resource budget utilization (current usage and requests) for this service classes mix.

Figure 5:
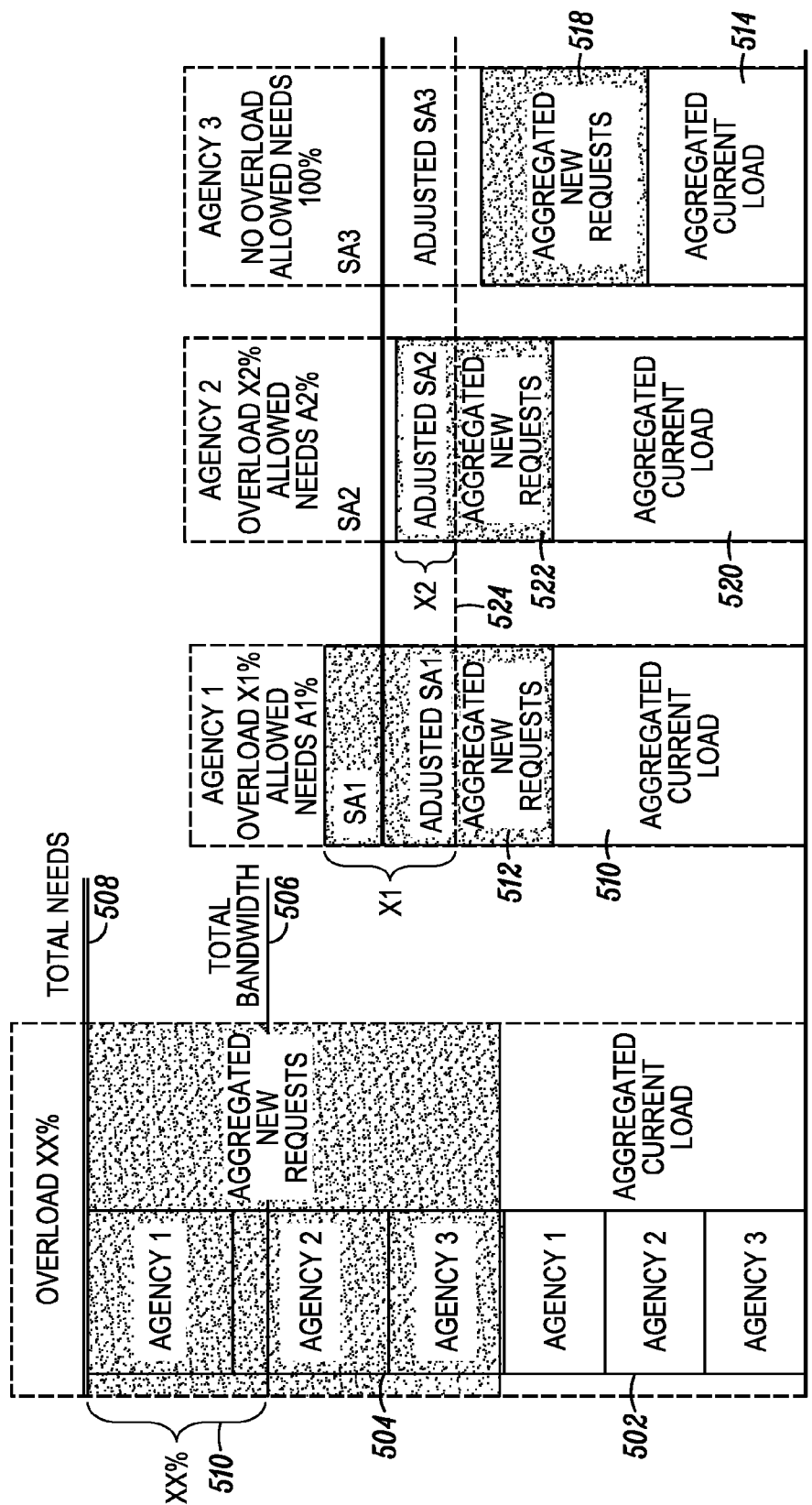
FIG. 5 is yet another chart diagram illustrating resource allocation using QoS aggregation over multiple QoS service classes in accordance with some embodiments.

FIG. 5 illustrates one method of calculating the allowed percentage of the resource needs for different agencies considering the current load distribution, the total resource level in the cell (maximum cell capacity), and the local QoS manager's resource budget (current usage and requests) for the service classes mix. Agencies A1, A2, and A3 provide their users with services of a particular service classes mix. As illustrated, an aggregated current load (502) with aggregated resource requests (504) for all three agencies (508) make XX % over (510) of the available cell resources (bandwidth or pre-defined threshold level) (506).

Each agency has its own service agreement for the available resources in the cell shown as SA1, SA2, and SA3 (they all are shown the same for simplicity but could be different). The shared wireless network QoS manager calculates an adjusted resource budget (524) for each agency to mitigate the total resource needs overload of XX %. If the agency's resource needs (current usage plus requests) are below the adjusted budget (as for Agency 3, sum of aggregations 514 and 518), then agency's requests are accepted. If the agency's resource needs are above the adjusted budget (for Agencies 1 and 2, respectively sum of aggregations 510 and 512 and aggregation 520 and 522), then the allowed percentage of resource needs for this agency (A1% for Agency 1 and A2% for Agency 2) is calculated to eliminate the overload (X1 for Agency 1 and X2 for Agency 2) and bring the total agency's needs below the adjusted budget level.

The local QoS manager/agencies, based on local consideration, can reduce the new resource requests or modify the service classes for some of the resource requests, reduce the rates for the existing sessions, or terminate some existing sessions to adjust (212) it resource usage to fit within the allocated dedicated bearer resources provided by the shared wireless network QoS manager. It is advantageous for the adjustments to be made at the local level rather than by the allowing the shared wireless network QoS manager to make admission control decisions for new sessions because the agencies/local QoS managers have a better view of priorities of SDFs for the agencies. After making the appropriate adjustments (212) for their resource usage and/or resource requests (e.g., by implementing any suitable session admission control/QoS adjustment algorithm), the agencies periodically provide the shared wireless network QoS manager with updated cell usage (202), cell load level (202) and additional resources need (214) for a repeat of method 200.

Considering multiple classes enables producing more accurate decisions for each of those classes by utilizing different specifics appropriate for different classes. For example, by averaging the rate over the maximum jitter per service class for all classes the QoS aggregator can tell if the current request mix from all agencies is acceptable or whether adjustments are needed. In one illustrative implementation, resource needs for a video service with large jitter from one agency is combined with other large jitter video sessions from other agencies as long as the total average rate is acceptable. Interactive voice service with very low jitter is combined with the sum of all sessions' rates. The decisions for each of those classes are made completely independent. However, the usage of multiple classes make possible a final result that is different (better) than if the evaluation is made without separation of the current usage and new requests between those different service classes.

Figure 6:
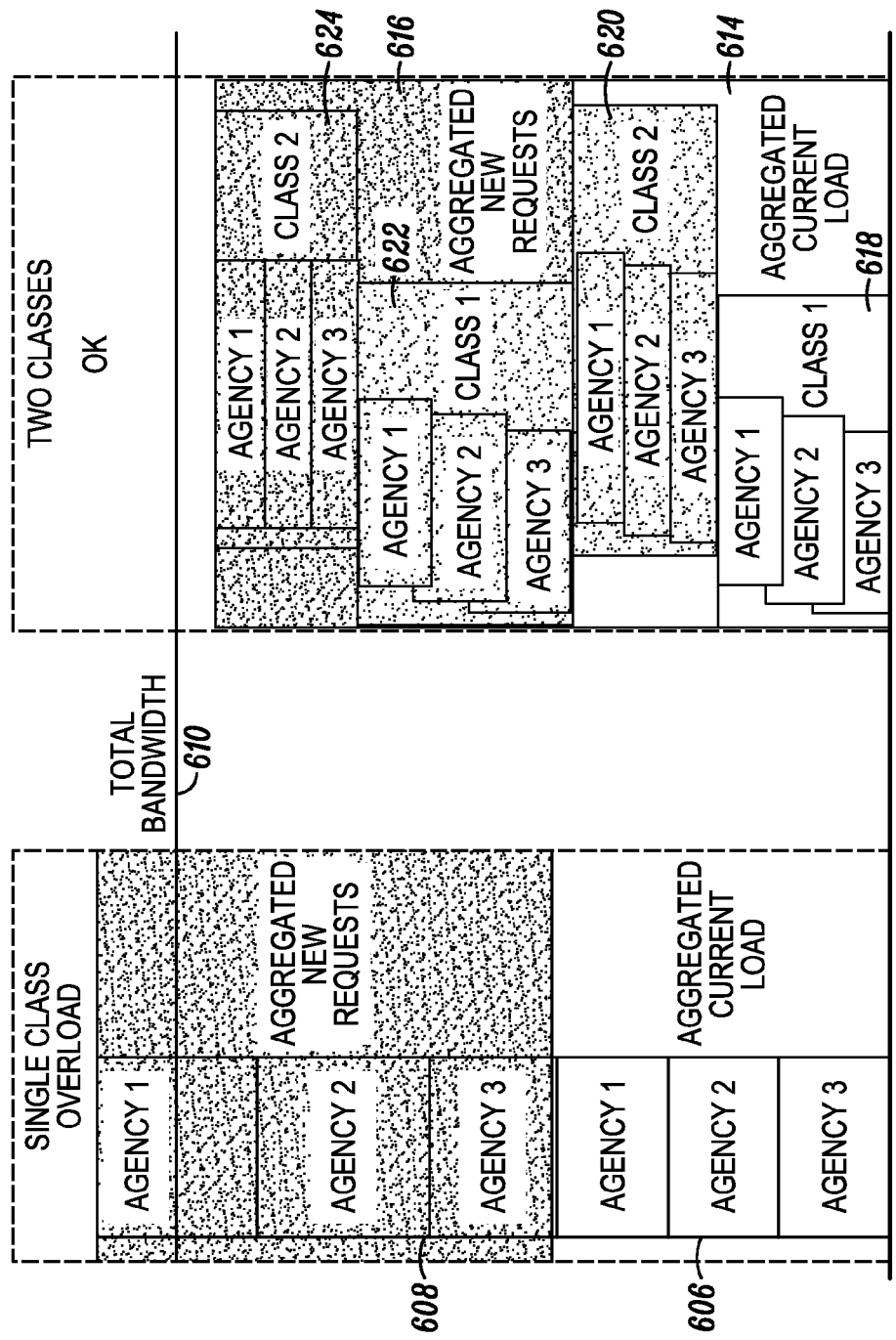
FIG. 6 is still another chart diagram illustrating resource allocation using QoS aggregation over multiple QoS service classes in accordance with some embodiments.

FIG. 6 illustrates this example. A simple summing of aggregated current load (e.g., cell load level indicators and cell usage) (606) for Agencies 1, 2, and 3 and aggregated new requests (608) for these three agencies exceeds total bandwidth (610) for the cell. However, for a QoS service class mix of classes 1 and 2 for these three agencies, the total resource need to meet an aggregated current load 614 (comprising load 618 for class 1 for Agencies 1, 2, and 3 and load 620 for class 2 for Agencies 1, 2, and 3) and aggregated new requests 616 (comprising requests 622 for class 1 for Agencies 1, 2, and 3 and requests 624 for class 2 for Agencies 1, 2, and 3) is below the total capacity (610) of the cell.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and apparatus for resource allocation in a shared RAN described herein. The non-processor circuits may include, but are not limited to, a radio receiver, a radio transmitter, signal drivers, clock circuits, power source circuits, and user input devices. As such, these functions may be interpreted as steps of a method to perform the resource allocation in a shared RAN described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for resource allocation in a shared wireless network that comprises a radio access network, a plurality of local Quality of Service (QoS) managers serving a plurality of subscribers, a shared wireless network QoS manager that manages resource allocations between the plurality of local QoS managers, and a plurality of cells for providing wireless resources to respective ones of the plurality of subscribers connected to the radio access network, the method comprising, at the shared wireless network QoS manager:

receiving an aggregation of current cell usage estimations representing a measure of a part of the wireless resources being used by the plurality of subscribers in the plurality of cells for each QoS service class in a plurality of QoS service classes, wherein the aggregation of current cell usage estimations are received from multiple ones of the local QoS managers;

receiving an aggregation of cell load level indicators representing at least one of a measure of congestion and an amount of traffic in the plurality of cells for each QoS service class in the plurality of QoS service classes;

receiving an aggregation of additional resources needed for each QoS service class in the plurality of QoS service classes, wherein the aggregation of additional resources needed is received from multiple ones of the local QoS managers for the plurality of cells;

determining from the aggregations of current cell usage estimations, cell load level indicators, and additional resources needed, a total capacity for each cell that is needed to satisfy a total resource need for each cell for all the local QoS managers; and comparing the total capacity need to a maximum capacity for each cell, and based on the comparison determining and communicating to each local QoS manager a percentage of total resource need for the local QoS manager that is granted for each cell.

2. The method of claim 1, wherein at least some of the aggregation of cell load level indicators are received from multiple ones of the local QoS managers for the plurality of cells.

3. The method of claim 2, wherein for at least a subset of the aggregation of cell load level indicators, each cell load level indicator in the subset comprises an estimate, by one of the local QoS managers, of network congestion in a single one of the cells for a single one of the QoS service classes.

4. The method of claim 3, wherein the estimate of network congestion is determined based on at least one QoS service class performance characteristic collected by the one local QoS manager for a plurality of subscribers in the single one of the cells.

5. The method of claim 1, wherein at least some of the aggregation of cell load level indicators are received from the plurality of cells.

6. The method of claim 1, wherein for at least a subset of the aggregation of cell load level indicators, each cell load level indicator in the subset comprises at least one QoS service class performance characteristic collected by one of the local QoS managers for a plurality of subscribers in a single one of the cells cell for a single one of the QoS service classes, wherein the at least one QoS service class performance characteristic provides a measure of current cell load in the single one of the cells.

7. The method of claim 1, wherein for a first one of the cells, the aggregation of cell load level indicators is provided by only a subset of the plurality of local QoS managers having subscribers in the first one of the cells.

8. The method of claim 1, wherein part of the aggregation of current cell usage estimations and additional resources needed is received from a local QoS manager that services 911 emergency calls.

9. The method of claim 1, wherein the percentage of total resource need for the local QoS manager that is granted is based on a combination of QoS service classes from the plurality of QoS service classes.

10. An apparatus for resource allocation in a shared wireless network that comprises a radio access network, a plurality of local Quality of Service "QoS" managers serving a plurality of subscribers, a shared wireless network QoS manager that manages resource allocation between the plurality of local QoS managers, and a plurality of cells for providing wireless resources to respective ones of the plurality of subscribers connected to the radio access network, the apparatus comprising:

an interface for:
receiving an aggregation of current cell usage estimations representing a measure of a part of the wireless resources being used by the plurality of subscribers in the plurality of cells for each QoS service class in a plurality of QoS service classes, wherein the aggregation of current cell usage estimations are received from multiple ones of the local QoS managers;
receiving an aggregation of cell load level indicators representing at least one of a measure of congestion and an amount of traffic in the plurality of cells for each QoS service class in the plurality of QoS service classes;
receiving an aggregation of additional resources needed for each QoS service class in the plurality of QoS service classes, wherein the aggregation of additional resources needed is received from multiple ones of the local QoS managers for the plurality of cells; and a processing device for:
determining from the aggregations of current cell usage estimations, cell load level indicators, and additional resources needed, a total capacity for each cell that is needed to satisfy a total resource need for each cell for all the local QoS managers;
comparing the total capacity need to a maximum capacity for each cell, and based on the comparison determining and communicating to each local QoS manager a percentage of total resource need for the local QoS manager that is granted for each cell.

11. The apparatus of claim 10, wherein the percentage of total resource need for the local QoS manager that is granted is based on a combination of QoS service classes from the plurality of QoS service classes.

12. A non-transitory computer-readable medium, comprising computer-readable instructions stored thereon, which when executed on a computer, results in the execution of the following steps for resource allocation in a shared wireless network that comprises a radio access network, a plurality of local Quality of Service "QoS" managers serving a plurality of subscribers, a shared wireless network QoS manager that manages resource allocation between the plurality of local QoS managers, and a plurality of cells for providing wireless resources to respective ones of the plurality of subscribers connected to the radio access network, the method comprising, at the shared wireless network QoS manager:

receiving an aggregation of current cell usage estimations representing a measure of a part of the wireless resources being used by the plurality of subscribers in the plurality of cells for each QoS service class in a plurality of QoS service classes, wherein the aggregation of current cell usage estimations are received from multiple ones of the local QoS managers;

receiving an aggregation of cell load level indicators representing at least one of a measure of congestion and an amount of traffic in the plurality of cells for each QoS service class in the plurality of QoS service classes;

receiving an aggregation of additional resources needed for each QoS service class in the plurality of QoS service classes, wherein the aggregation of additional resources needed is received from multiple ones of the local QoS managers for the plurality of cells;

determining from the aggregations of current cell usage estimations, cell load level indicators, and additional resources needed, a total capacity for each cell that is needed to satisfy a total resource need for each cell for all the local QoS managers; and comparing the total capacity need to a maximum capacity for each cell, and based on the comparison determining and communicating to each local QoS manager a percentage of total resource need for the local QoS manager that is granted for each cell.

13. The computer-readable medium of claim 12, wherein the percentage of total resource need for the local QoS manager that is granted is based on a combination of QoS service classes from the plurality of QoS service classes.

* * * * *

UNITED STATES PATENT AND TRADEMARK OFFICE
CERTIFICATE OF CORRECTION

| | | |
|---|---|---|
| PATENT NO. | : 8,233,449 B2 | Page 1 of 1 |
| APPLICATION NO. | : 12/648476 | |
| DATED | : July 31, 2012 | |
| INVENTOR(S) | : Agulnik et al. | |

It is certified that error appears in the above-identified patent and that said Letters Patent is hereby corrected as shown below:

In the claims:

In Column 13, Line 28, in Claim 6, delete "the cells cell" and insert -- the cells --, therefor.

Signed and Sealed this
First Day of January, 2013

David J. Kappos
*Director of the United States Patent and Trademark Office*